No. 698,081. Patented Apr. 22, 1902.
W. TURNER.
HILLSIDE PLOW.
(Application filed Dec. 20, 1901.)
(No Model.) 2 Sheets—Sheet 1.

Wesley Turner, Inventor

Witnesses

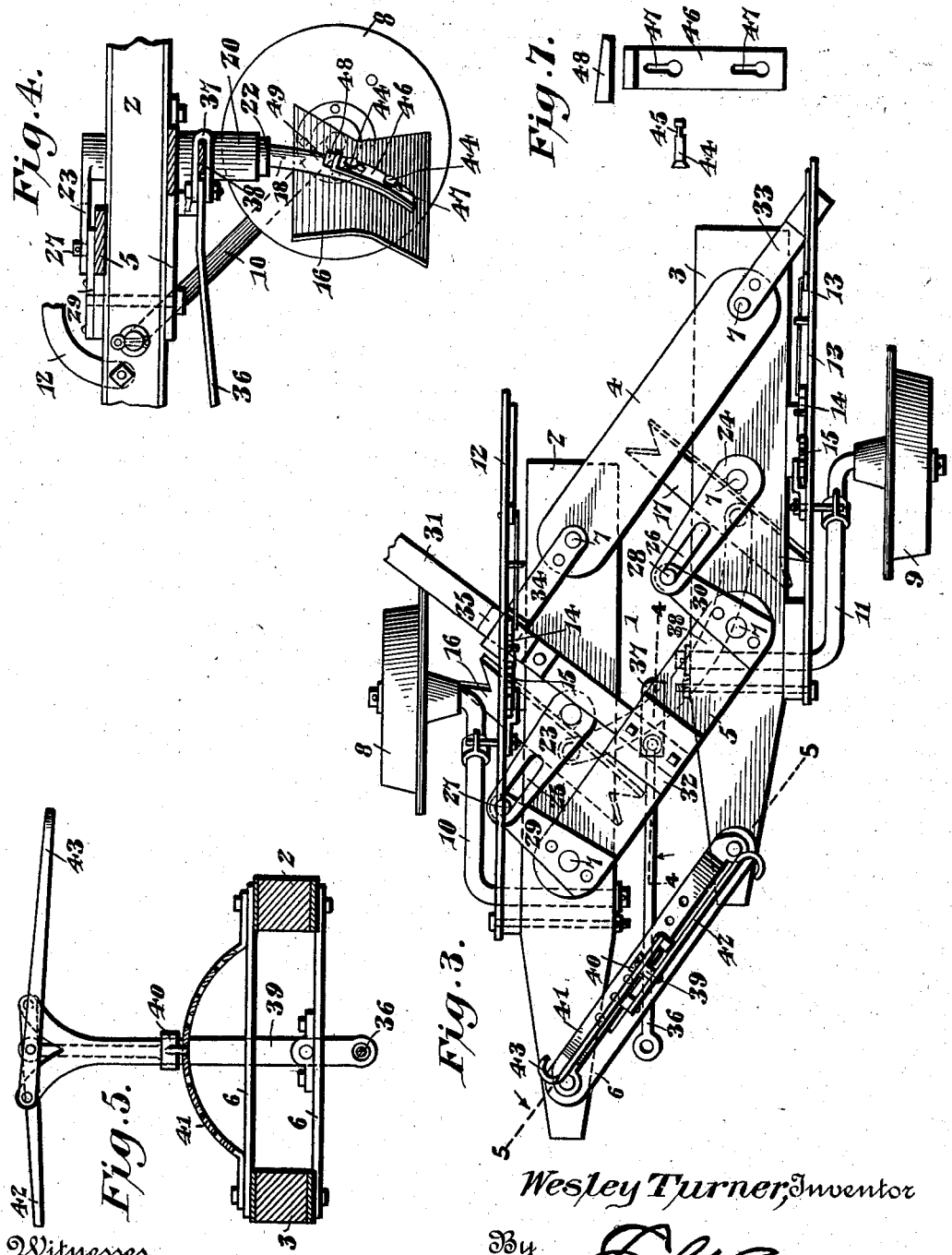

United States Patent Office.

WESLEY TURNER, OF PASO ROBLES, CALIFORNIA.

HILLSIDE-PLOW.

SPECIFICATION forming part of Letters Patent No. 698,081, dated April 22, 1902.

Application filed December 20, 1901. Serial No. 86,678. (No model.)

*To all whom it may concern:*

Be it known that I, WESLEY TURNER, a citizen of the United States, residing at Paso Robles, in the county of San Luis Obispo and State of California, have invented a new and useful Hillside-Plow, of which the following is a specification.

This invention relates to a novel hillside-plow, and has for its primary object to produce a plow constructed in a manner to facilitate the reversal of the plowshares or plows proper in order that the earth may be thrown up in the same direction while the plow is traversing the hillside in opposite directions.

A further object of the invention is to provide for the shifting of the land-wheels simultaneously with the reversal of the plows, so that the advanced wheel will always be located down the hill—that is to say, at the lower side of the furrow—to resist as much as possible the swerving of the plow incident to the inclination of the ground.

Further and subordinate objects of the invention will hereinafter more fully appear, as the necessity for their accomplishment is developed, in the succeeding description of that form of my invention which for the purpose of illustration I have embodied in the accompanying drawings.

Figure 1:
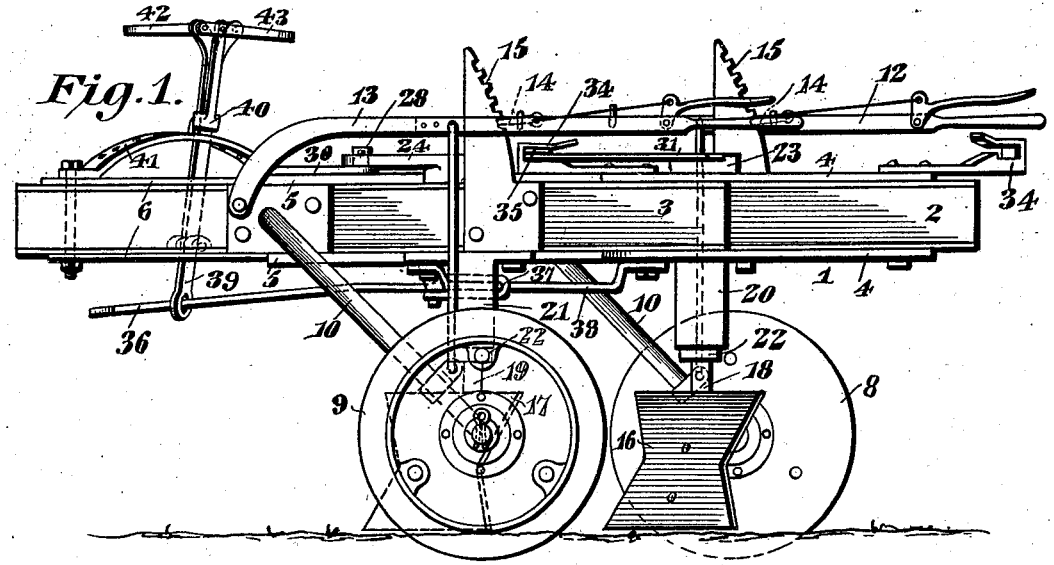
Figure 6:
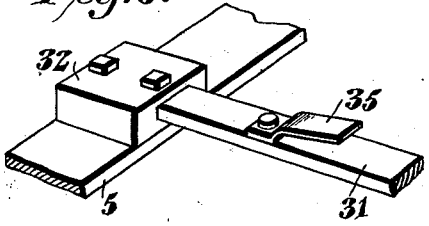
Figure 2:
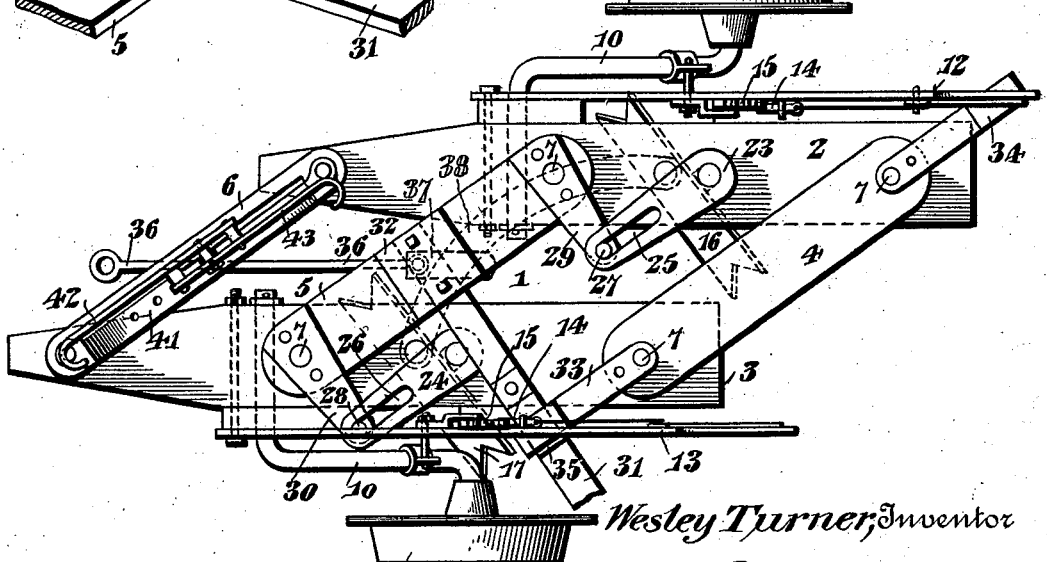

In said drawings, Figure 1 is a side elevation of my plow complete, showing the land-wheels depressed for the purpose of elevating the plows sufficiently to permit of their reversal. Fig. 2 is a top plan view of the subject-matter of Fig. 1. Fig. 3 is a similar view with the plows reversed. Fig. 4 is a detail sectional view, partly in elevation, on the line 4 4 of Fig. 3 looking in the direction of the arrow. Fig. 5 is a sectional elevation on the line 5 5 of Fig. 3. Fig. 6 is a detail view showing the manner of connecting the reversing-lever with the transverse frame member; and Fig. 7 is a detail view of the heel-plate, wedge, and bolts employed to secure each of the plows or shares to its shank.

Like numerals of reference are employed to designate corresponding parts throughout the views.

The frame of the plow (designated generally by the numeral 1) is composed of the parallel longitudinal members or side beams 2 and 3, connected and maintained at all times in parallel relation by the transverse frame members 4, 5, and 6. Each of these members is composed of upper and lower plates disposed, respectively, above and below the side members and having pivotal connection therewith by means of bolts 7, passed through the plates and the intermediate side beams and secured by nuts, as shown. This construction of the frame permits the relative longitudinal and lateral adjustment of the side beams in a manner and for a purpose to be explained, but insures their retention in parallel relation, so that the wheels 8 and 9, carried by the opposite side beams, will always have their axes disposed at right angles to the line of draft irrespective of the positions of the frame members. These land-wheels 8 and 9 are mounted upon the angular ends of swinging arms or cranks 10 and 11, the forward ends of which are provided with suitable bearings in the side beams, and in order to effect the relative elevation or depression of these wheels the cranks or arms 10 and 11 are arranged to be swung by means of wheel-levers 12 and 13, pivoted at their forward extremities to the outer sides of the beams 2 and 3 and having detents 14, disposed for engagement with segmental racks 15, upstanding from the side beams, in order that the levers may be sustained in their adjusted positions, and thereby retain the land-wheels at the desired elevation relative to the frame. As a matter of fact this vertical adjustment of the wheels is only relative, as the primary object of such adjustment is to raise and lower the frame for the purpose of elevating or depressing the plows or shares 16 and 17, disposed below the side beams or longitudinal frame members and carried by rotatable shanks 18 and 19, provided with suitable bearings 20 and 21 and extended upwardly through the longitudinal members of the frame. Longitudinal movement of these plow-shanks is prevented by collars 22, secured thereon below the bearings, and by crank-arms 23 and 24, secured to the upper ends of the shanks. The primary object of these cranks, however, is to communicate rotary movement to the shanks sufficient to effect the reversal of the plows— that is to say, to reverse the angular position of the plows with respect to the line of draft, so that the furrow may be turned and the earth thrown in the same direction whether the plow is traversing or retraversing the hillside. It has been premised, however, that one of the objects of the invention is to cause the land-wheels to be relatively shifted in the longitudinal direction of the frame whenever the plows or shares are reversed, so that in whichever direction the plow may be moving the advanced land-wheel will be located downhill—that is to say, at that side of the plow located nearest the bottom of the inclination. This may obviously be accomplished by shifting either of the side beams to the advanced position, and I have therefore devised means whereby said relative shifting of the frame members will not only shift the relative positions of the land-wheels, but will also reverse the positions of the plows.

The crank-arms 23 and 24, attached to the upper ends of the plow-shanks, are provided with longitudinal slots 25 and 26, arranged to engage the upstanding pins or projections 27 and 28, formed at the ends of a pair of arms 29 and 30, projecting rearwardly from the opposite ends of the upper plate of the transverse frame member 5. As these arms are rigid with the member and extend therefrom in directions radial to the bolts 7, constituting the pivotal connections between the transverse and longitudinal frame members, it will be seen that any relative movement of the side beams will cause corresponding movement of the transverse member 5 to swing the arms 29 and 30, and thereby effect such movement of the crank-arms 23 as may be necessary to effect the axial adjustment of the plows.

The relative movement of the frame members to effect the simultaneous adjustment of the land-wheels and plows may be accomplished in a number of ways; but the simplest embodiment of mechanism for this purpose is shown in the drawings and comprehends what may be termed a "reversing-lever" 31, extending rearwardly from the center of the transverse member 5 and secured to the upper plate thereof, as by a suitable boxing 32. As the reversing-lever is rigid with the member 5, the lateral swinging of the former will swing the member, and thereby move the side beams 2 and 3 longitudinally in opposite directions to advance either of the land-wheels and to reverse the plows. When the reversing-lever 31 has been thrown to either of its extreme positions, (shown in Figs. 2 and 3, respectively,) it is designed to be retained by one of a pair of keepers 33 and 34, extending from the opposite ends of the transverse frame member 4, and preferably from the upper plate thereof. The retention of the lever within the keepers is assisted by a spring 35, secured upon the lever and designed to present considerable frictional resistance to the withdrawal of the lever from said keepers. It will be noted that the natural tendency of the draft will be to swing the lever 31 to an intermediate position—that is to say, to a position parallel with the side beams; but as this tendency is resisted by the engagement of the lever with its appropriate keeper these elements constitute means for locking the frame members in their adjusted positions and also incidentally effect the locking of the plows and land-wheels in the positions to which these elements have been moved.

Obviously provision must be made for attaching the draft or draw bar 36 in a manner to insure its location at the center of draft no matter what the position of the parts may be. I therefore secure the rear end of the draw-rod to a yoke 37, slidable upon an arcuate link 38, pivoted at its opposite ends to the under sides of the side beams 2 and 3 at intermediate points thereof, and to further insure the proper positioning of the rod for the purpose of eliminating unnecessary side strain the front end of the rod is passed through the depending end of what may be termed a "draft-lever" 39, pivotally mounted in the transverse frame member 6 and provided with a detent 40, disposed to engage a segmental rack 41 and to be operated by a pair of releasing-arms 42 and 43. (See Figs. 1 and 3.) As shown in Fig. 5, the draft-lever is fulcrumed upon the lower plate of the transverse member 6, and both plates of said member are slotted to facilitate its movement.

In Figs. 4 and 7 is shown a simple and effective arrangement for attaching the plow proper or the plowshare to the standard or shank. This arrangement comprehends a pair of bolts 44, passed through the share and shank and each having adjacent to its rear end a reduced portion 45. The heel-plate 46 is provided with key-slots 47, through the large ends of which the rear ends of the bolts are passed until the reduced portions 45 thereof come into coincidence with the slots in the plow. The plate is then shifted down to the position shown in Fig. 4 and is retained securely in position by a wedge 48, passed between the upper end of the heel-plate and the adjacent shoulder 49, formed on the shank or standard. By this means the share is securely held, but may be readily removed to effect its replacement when necessary by simply driving back the wedge and elevating the heel-plate sufficiently to permit the withdrawal of the bolts 44.

The operation of my device is as follows: Supposing the parts to be positioned as indicated in Fig. 2, the plow is drawn across the hillside with the advanced land-wheel 9 disposed toward the bottom of the hill. In such relative positions of the wheels and side beams, which are adjustable therewith, the plows or shares will be disposed at a proper angle to throw the dirt downhill, which direction it naturally takes by gravitation. In consequence of this the load upon the draft-animals will be minimized and side strains, usually incident to hillside-work, will be prevented, for the reason that the advanced position of the lower land-wheel will overcome the natural tendency of the plow to swerve downhill. Suppose, however, that after crossing the hillside it is desired to retraverse the field. It will be seen that in this event the change of direction would cause the plows to throw the earth uphill, and, furthermore, the advanced land-wheel would be located toward the top of the hill instead of toward the bottom thereof. Both the load and lateral strain upon the animals would therefore be increased, and the primary object of my invention is to overcome these conditions and to effect such rearrangement of the parts as will restore the normal conditions first described while the plow is returning across the field in the direction opposite to its first movement. To accomplish this result, the levers 12 and 13 are swung down to depress the wheels when the far side of the field is reached. This depression of the wheels will effect the elevation of the shares to withdraw them from the furrow. The reversing-lever 31 is now released from the keeper 33 and is swung around to the position shown in Fig. 3 of the drawings, where it is secured by the keeper 34. The consequent movement of the member 5 will cause the side beams to be relatively adjusted longitudinally for the purpose of advancing the wheel 8 beyond the wheel 9, as shown in Fig. 3, and this rearrangement of the frame members will as we have seen, effect the swinging of the crank-arms 23 and 24 and the reversal of the shares, so that as the plow returns across the field the earth will be thrown downhill and the land-wheel at the lower side of the plow will be in an advanced position. At the same time proper centralization of the draft is assured by reason of the fact that the drift-link 38 will be shifted as the frame members are adjusted and, moving through the yoke 37, will cause the latter to maintain its proper position midway between the side beams, and any disposition of the bar 36 to assume an angular position will be effectually overcome by the draft-lever 39, which, as we have seen, acts as a guide for the front end of the draft-bar and may be variously adjusted to accommodate the conditions of use.

From the foregoing it is thought that the construction, operation, and many advantages of my invention will be clearly apparent; but while the illustrated embodiment thereof is believed at this time to be preferable I wish to reserve the right to effect such changes, modifications, and variations of the illustrated structure as may be suggested by experience and experiment and properly embraced within the scope of the protection prayed.

What I claim is—

1. In a plow, the combination with a frame comprising side beams, of reversible plowshares disposed below the frame, means for effecting the relative endwise movement of the side beams, and means operated by the movement of the side beams for effecting the reversal of the individual shares.

2. In a plow, the combination with a frame comprising side beams, of reversible plowshares disposed below the frame, a reversing-lever for effecting the relative endwise adjustment of the side beams, and means operated by the movement of the side beams for reversing the individual shares.

3. In a plow, the combination with a frame, of a plurality of reversible shares carried by the frame, and a reversing-lever arranged to simultaneously effect the adjustment of the frame members and the reversal of the several shares.

4. In a plow, the combination with a frame composed of pivotally-connected longitudinal and transverse frame members, of means for changing the relative positions of said members, means for locking the members in the positions to which they are moved, and reversible plows carried by certain of the members and operatively connected to certain other members, to effect the reversal of said plows when the frame members are adjusted.

5. In a plow, the combination with longitudinal frame members provided with rotary shanks or standards, and shares carried thereby, of means for shifting said longitudinal frame members in opposite directions, and means for rotating the shanks or standards through such relative movement.

6. In a plow, the combination with a frame comprising adjustable members, of rotary standards mounted in the frame, shares carried by the standards, and a reversing-lever operatively connected to the frame members and standards to adjust the members and rotate the standards simultaneously.

7. In a plow, the combination with a frame comprising side beams, of land-wheels carried by said beams, reversible plowshares disposed below the beams, means for effecting the relative endwise adjustment of the side beams to advance either of the land-wheels, and means for effecting the individual reversal of the shares.

8. In a plow, the combination with a frame comprising a pair of side beams, land-wheels carried by the side beams, and means for shifting the side beams longitudinally to effect the advance of one of the land-wheels, of rotary shares disposed below the frame, and means for automatically reversing the shares when the side beams are relatively adjusted.

9. In a plow, the combination with a frame comprising relatively adjustable side beams, and land-wheels movable independently of the beams, of reversible plowshares disposed below the frame, means for raising and lowering the land-wheels to effect the raising and lowering of the shares, means for effecting the relative adjustment of the side beams, and means for reversing the shares.

10. In a plow, the combination with a frame comprising a pair of relatively movable side beams, and connecting members, of landwheels independently movable with the side beams, rotary standards carried by the side beams, shares mounted on the standards, means for raising and lowering the landwheels to effect the elevation and depression of the shares, means for simultaneously shifting the side beams and reversing the shares, and means for locking said parts in their adjusted positions.

11. In a plow, the combination with a frame comprising longitudinal and transverse frame members having pivotal connection, of plowshares disposed below the longitudinal frame members, and a reversing-lever connected to one of the transverse frame members and constituting means for effecting the adjustment of the frame.

12. In a plow, the combination with a frame comprising side beams, and transverse frame members pivotally connected to the side beams, of a reversing-lever extending from one of the transverse frame members and constituting means for adjusting the frame, rotary standards mounted in the side beams and provided with plowshares, and means for effecting a connection between a frame member and a standard to rotate the latter through the movement of said transverse member.

13. In a plow, the combination with a frame comprising side beams, and transverse frame members pivotally connected thereto, of rotary standards mounted in the side beams and provided with crank-arms, plow-shares mounted on the standards, and means operatively connecting the crank-arms with a transverse frame member, whereby the standards will be rotated when said transverse member is shifted with respect to the side beams.

14. In a plow, the combination with side beams, and transverse frame members pivotally connected thereto and provided with arms, of rotary standards mounted in the side beams and having crank-arms operatively connected with the arms of a transverse member, and shares mounted on the standards.

15. In a plow, the combination with side beams, and transverse members pivotally secured thereto, of rotary standards mounted in the side beams and provided with shares, a crank-arm mounted on each of the standards, arms projecting from the opposite ends of the transverse members and engaging the crank-arms of the standards, and a reversing-lever secured to the transverse member and extended rearwardly.

16. In a plow, the combination with side beams, and transverse frame members, of rotary standards mounted in the side beams, shares carried by the standards, means for effecting the rotation of the standards through the relative movement of the side beams, a reversing-lever extended rearwardly from one of the transverse frame members, and keepers carried by another of the transverse frame members for the retention of the reversing-lever.

17. In a plow, the combination with a frame comprising side beams, and transverse members pivotally connected to the side beams, of shares disposed below the side beams, a draft-link pivotally connected at its opposite ends to the side beams, and a draw-bar shiftably connected to the draft-link.

18. In a plow, the combination with side beams, transverse frame members, and shares, of means for adjusting the relative positions of the said members, a draft-link pivotally connected at its opposite ends to the side beams, a draw-bar shiftably connected at its rear end to the draft-link, and an adjustable draft-lever disposed in advance of the draft-link and serving as a guide for the draw-bar.

19. In a plow, the combination with a standard provided with a shoulder, and a share, of a pair of bolts passed through the standard and share and provided with reduced portions, a heel-plate provided with key-slots for the reception of the bolts, and a wedge disposed between one end of the heel-plate and the shoulder of the standard.

In testimony that I claim the foregoing as my own I have hereto affixed my signature in the presence of two witnesses.

WESLEY TURNER.

Witnesses:
F. B. LADD,
L. G. SINNARD.